_____

2,860,954

METHOD OF PRODUCING PURIFIED SELENIUM FROM SELENIOUS ACID SOLUTION CONTAINING IMPURITIES

Edgar L. Bueker and Vernon K. Kofron, St. Louis, Mo., assignors to Vickers Incorporated, Detroit, Mich., a corporation of Michigan No Drawing. Application August 18, 1953
Serial No. 375,070

4 Claims. (Cl. 23—209)

This invention relates to power transmission and more particularly to the purification of selenium, especially for use in selenium devices, such as, rectifier cells, photocells, etc.

Selenium of less than 99.99% purity is considered unsuitable for use in high grade photocells, rectifier cells, etc. Much of the commercially available selenium does not reach this degree of purity. The following impurities are often found in commercially available selenium: arsenic, nickel, zinc, tellurium, cadmium, mercury, lead, tin, iron, bismuth, copper, and silver. Such impurities must be substantially removed from the selenium in order to obtain the optimum electrical characteristics in rectifier and photocells made therefrom.

Although processes heretofore known in the prior art are effective in varying degrees to remove some of the metallic impurities from selenium, they generally have one or more of the following disadvantages: inefficiency; expensiveness; complexity; and inability to remove all the impurities, especially mercury.

Particular impurities, for example mercury, even in low concentration, such as one part in a million by weight, are undesirable in selenium employed in rectifier cells.

The process of the present invention is highly efficient, economical, and relatively simple, and will substantially remove all metallic impurities, including mercury, from impure selenium with a minimum loss of selenium. The process is especially suitable for purifying commercially available grades of selenium which are less than 99.99% pure.

In accordance with one embodiment of the present invention a small quantity of freshly precipitated selenium is dispersed through a selenious acid solution to remove the mercury, after which other metallic impurities are removed by a cation exchanger. The selenium is then precipitated out of the remaining solution.

It is therefore an object of the present invention to provide a new process for the purification of selenium.

Another object of the invention is to provide a novel method for removing metallic impurities from selenium.

A further object of the invention is to provide a new process for removing mercury from selenium.

Further objects and advantages of the present invention will be apparent from the following description.

In a preferred manner of practicing the invention, a quantity of relatively impure selenium is converted to selenious acid by any suitable method, such as converting the selenium to selenium dioxide by direct oxidation and then dissolving the $SeO_2$ in water, or by digesting selenium in an acid and then removing the digesting acid leaving a remainder of selenious acid, etc.

For the next step of the process, that of mercury removal with freshly precipitated selenium, the selenious acid is diluted, preferably with water, and the pH of the solution is adjusted to fall within the range of .8 to 2 inclusive. Varying from these limits results in poor mercury removing ability such that the amount of selenium precipitate used in the mercury removal becomes excessive and uneconomical. Although the pH may be adjusted by adding a base, such as ammonium hydroxide, sodium hydroxide, etc., to the selenious acid solution, the use of such bases adds a contaminant which may hinder the effectiveness of the cation exchange column used in a later step of the present process, and also may result in an inferior end product unless the base contamination is removed. Preferably the pH is adjusted by simply diluting with sufficient water, since even tap water is usually less likely to add undesirable contaminants to the solution.

When sufficient water is added to the selenious acid to bring the pH within the range of .8 to 2, the specific gravity of the resulting solution will be approximately in the range of 1.1 to 1.2 inclusive, which is desirable for the most efficient workability of the process. Although the specific gravity is not critical, a value of approximately 1.15 has been found desirable in practice. For the most effective removal of mercury in the following step of the process, elevated temperatures of the selenious acid solution should be avoided because it was found that as the temperature increases the effectiveness of the mercury removal decreases and the amount of selenium used in the mercury removal increases. The mercury removal ability is good and the amount of selenium used is low with a solution temperature approximately between 6° C. and 45° C., and it is preferred to keep the solution temperature within this range during this stage of the process. In actual commercial practice of this process, ordinary tap water is regularly used to dilute the selenious acid and the temperature of the solution is governed by the tap water temperature and the room temperature as the solution is mixed. Thus, in actual practice this step of the process is carried out substantially at room temperature.

After the pH of the solution has been adjusted as described, the mercury is removed from the selenious acid solution by dispersing through the solution freshly precipitated selenium which has a great affinity for mercury. This may be done by adding independently obtained freshly precipitated selenium to the solution or by inducing a partial precipitation of the selenium in the solution. In either case, as hereinbefore stated, elevated solution temperatures should be avoided and the selenium precipitate should be well dispersed through the solution, as by stirring, to allow the selenium precipitate to effectively adsorb all the mercury in the solution.

Freshly precipitated selenium may be obtained by adding a reducing agent, for example sulphur dioxide, to a selenious acid solution separate from the main solution. The selenium precipitate thus obtained is added to the main selenious acid solution which should be stirred to uniformly distribute the selenium precipitate, thereby allowing it to adsorb the mercury in the solution. The amount of selenium required for the mercury removal is equal to less than 1% of the weight of selenium in the main solution. However, if more selenium precipitate is used, no injury will result except that the excess selenium is wasted.

To effect the mercury removal by induced partial precipitation, a small quantity of selenium is precipitated by adding a reducing agent, preferably a metal-free agent, to the selenious acid solution. As stated hereinbefore, elevated solution temperatures should be avoided, the preferred temperature range being approximately between 6° C., and 45° C. Sulphur dioxide is a preferred example of a metal-free reducing agent; other examples are: hydroxylamine hydrochloride, and hydrazine sulfate. Only enough selenium need be precipitated to remove the mercury. Less than 1% of the total weight of the selenium in the solution need be precipitated for even the heaviest concentrations of mercury found in commercially available selenium. If more selenium is precipitated than required to collect all the mercury, the excess selenium used is wasted. The amount of reducing agent required for any given set of conditions can easily be determined empirically by known laboratory procedures.

Whether the mercury removal is effected by adding freshly precipitated selenium to the solution or by inducing a partial precipitation of the selenium in the solution, the amount of selenium precipitate required is very small as long as the disclosed pH values are adhered to and the temperature is not too high. Either higher pH values or elevated temperatures will result in poor mercury removing ability and in excessive selenium use or loss in attempting to remove the mercury. When both the pH and the temperature are high, mercury removing ability is so poor that the amount of selenium precipitate required is prohibitive. For example, with the solution pH between 4 and 7 and the temperature at approximately 60° C., the amount of selenium lost in induced partial precipitation ranged to 25% of the total selenium content of the selenious acid solution, which is economically intolerable.

As long as the pH is approximately between .8 and 2 and the temperature is not too high, the actual selenium used or lost in removing even heavy concentrations of mercury, such as 500 parts per 1,000,000, will be equal to less than 1% of the total weight of selenium in the solution, and in actual practice the amount of selenium used or lost was found to range from .1% to .5%. Although the quantity of selenium precipitate used is very small, it very effectively removes all of the mercury from the solution because of the great affinity which selenium has for mercury.

After the mercury is collected by the selenium precipitate, the solution is filtered, the precipitated selenium with the adsorbed mercury is discarded and the filtrate is passed through a suitable cation exchanger to remove other metallic impurities. Any cation exchange substance, organic or inorganic, may be used that will remove metallic ions and is stable at low pH values, such as sulphonated styrene type cation exchanger having —$SO_3H$ exchange groups, sulphonated phenolic types, carboxylic acid types, etc.

After the solution passes through the cation exchanger, the selenium in the solution is recovered by any suitable process. For example, the selenium may be recovered by precipitation by passing a reducing agent, for example sulphur dioxide, through the solution in sufficient quantity to precipitate all of the selenium remaining in the solution. In actual practice the temperature of the solution during the final precipitation step is preferably controlled between 45° C., and 55° C. Temperatures above 55° C., are workable but the process is more difficult to handle. Impurities, which may still be in solution up to the final precipitation step, remain in the filtrate, and are thus separated from the recovered selenium. After filtering, the filter cake (the recovered selenium) is washed with water and then further treated in boiling water to convert the amorphous selenium to the grey crystalline form.

The present invention is further illustrated by the following specific examples which were performed on two batches of commercial selenium, each batch weighing approximately one-hundred-fifty pounds.

The batch was first spectographically analyzed for its impurity content, as will be noted in the tables hereinafter shown, after which the selenium was converted to the grey or crystalline form by heating and then pulverized into one-eighth inch pieces or smaller. Grey selenium reacts at a greater rate with nitric acid. The pulverized selenium was then digested in nitric acid. After the selenium was thoroughly digested the resulting acid solution, which included selenious acid and nitric acid, was heated to remove the nitric acid by evaporation. Although the evaporation can be carried to the extent of leaving a dry residue of selenium dioxide which will form selenious acid when dissolved in water, it is much more economical to limit the evaporation to just the removal of nitric acid, leaving a remainder of selenious acid. Sufficient water was then added to the selenious acid to bring the pH of the solution to 1 and a specific gravity of 1.15.

Insoluble materials remaining in the solution after the digestion were removed by filtration and the remaining selenious acid solution, which at this point had a pH of 1 and a temperature of 30° C., was subjected to gaseous sulphur dioxide exposure to induce a partial precipitation of the selenium in the solution. Six ounces of sulphur dioxide were bubbled through the selenious acid solution at the rate of one ounce per minute while the solution was being agitated. The solution was allowed to stand long enough to complete the reaction, which was approximately two and one-half hours.

The selenium precipitate with the adsorbed mercury, was separated from the solution and weighed. The weight of this residue was approximately three ounces. This, of course, included the mercury adsorbed or collected by the selenium precipitate. Thus, the selenium used in this step was less than .2% of the total selenium content of the solution.

The remaining solution was then passed through a sulphonated styrene cation exchanger having —$SO_3H$ exchange groups where other metallic impurities were removed as noted in the tables.

After passing through the cation exchanger, sulphur dioxide was added to the solution to precipitate the balance of selenium from the solution. During this sulphur dioxide treatment, the solution was under constant agitation and maintained at temperatures ranging between 46° and 51° C. Liquid sulphur dioxide was used because its heat of vaporization is high enough to help cool the selenious acid solution during the precipitation. Three-hundred-twenty-five pounds of liquid sulphur dioxide were passed through the selenious acid solution in a six-hour period. As soon as all of the selenium was precipitated the precipitate was removed by filtration and the recovered selenium was washed in water to remove the sulphuric acid which forms during the reaction. The recovered selenium was then treated with boiling water to remove any further traces of acid and to convert the amorphous selenium to the grey crystalline form, after which it was dried and used in making selenium rectifiers.

The following tables indicate the purity of the selenium before and after each step of the process.

*Impurity content of selenium in various stages of purification*

(parts per million)

BATCH NO. 1

| Impurity | Before Partial Precipitation, p. p. m. | After Partial Precipitation, p. p. m. | After Ion Exchange, p. p. m. | Final Selenium, p. p. m. |
|---|---|---|---|---|
| Cadmium | 6 | 5.2 | 0.2 | less than 0.1. |
| Arsenic | 13 | 13 | 2.2 | None. |
| Tellurium | over 1,000 | over 1,000 | 9 | Do. |
| Mercury | 120 | None | None | Do. |
| Lead | 62 | 62 | do | Do. |
| Tin | 70 | 70 | 41 | 0.5. |
| Iron | over 1,000 | over 1,000 | 7.7 | 3.0. |
| Bismuth | 20 | 20 | 0.5 | 0.3. |
| Copper | 19 | 19 | None | 0.1. |
| Silver | 0.4 | 0.4 | 0.1 | None. |
| Nickel | 11.5 | 11.5 | 0.2 | 0.2. |
| Zinc | Trace | Trace | None | None. |

BATCH NO. 2

| Impurity | Before Partial Precipitation, p. p. m. | After Partial Precipitation, p. p. m. | After Ion Exchange, p. p. m. | Final Selenium, p. p. m. |
|---|---|---|---|---|
| Cadmium | 5.6 | 5.6 | 0.1 | 0.1 |
| Arsenic | 14 | 11 | 10 | None. |
| Tellurium | over 1,000 | over 1,000 | 25 | Do. |
| Mercury | over 160 | None | None | Do. |
| Lead | 68 | 80 | do | Do. |
| Tin | 160 | 160 | 32 | 0.5. |
| Iron | over 1,000 | over 1,000 | 75 | 1.0. |
| Bismuth | 32 | 32 | 0.4 | 0.4. |
| Copper | 11 | 5 | 0.1 | 0.1. |
| Silver | 7 | 7 | None | None. |
| Nickel | 35 | 10.5 | do | Do. |

As an alternative the mercury can be removed after the diluted selenious acid solution is passed through the cation exchanger instead of before as hereinbefore described. In that case the diluted selenious acid is first passed through the cation exchanger and then the mercury is removed with a small quantity of freshly precipitated selenium, either independently obtained or by induced partial precipitation as described. The precipitate with the collected mercury is then separated from the solution, after which all the selenium in the solution is recovered as described.

If the selenium to be purified is free of mercury or if the contamination is very low, then the mercury removal step may be omitted and only the cation exchanger need be used as described. Where the mercury content is very low, such as a few parts per million, the cation exchanger will remove it. If the mercury removal step is omitted and only the cation exchanger is used, the pH of the solution is not critical as long as the solution is acid. However, the pH will not normally be higher than 2 if water only is used to dilute and adjust the pH of the solution, unless the solution is diluted to impractical proportions. It is for the mercury removal step that the pH is critical and should be approximately between .8 and 2 as hereinbefore stated.

It was found that the high purity selenium obtained with this process when used in the manufacture of selenium rectifier cells resulted in cells having relatively higher inverse resistance, greater life, and more stability than cells made with relatively impure selenium.

While the form of embodiment of the invention as herein disclosed constitutes a preferred form, it is to be understood that other forms might be adopted, all coming within the scope of the claims which follow.

What is claimed is as follows:

1. The method of producing selenium from a selenious acid solution containing impurities including mercury, said method comprising the steps of adjusting the pH of the solution to approximately between .8 and 2, dispersing a small quantity of freshly precipitated selenium through the solution, thereby to collect the mercury in the solution, separating the precipitate with the mercury collected thereby from the solution, passing the solution through a cation exchanger, and finally recovering the selenium from the solution.

2. The method of producing selenium from a selenious acid solution including mercury as an impurity, said method comprising the steps of adjusting the pH of the solution to approximately between .8 and 2, dispersing a small quantity of freshly precipitated selenium through the solution, thereby to collect the mercury in the solution, separating the precipitate with the mercury collected thereby from the solution, and finally recovering the selenium from the solution.

3. The method of producing selenium from a selenious acid solution containing impurities including mercury, said method comprising the steps of adjusting the pH of the solution to approximately between .8 and 2, treating the solution with sulphur dioxide to precipitate a small amount of selenium thereby to collect the mercury in the solution, separating the selenium precipitate with the mercury collected thereby from the solution, passing the solution through a cation exchanger, and recovering the selenium from the solution by treating the solution with sulphur dioxide to precipitate the selenium therein.

4. The method of producing selenium from a selenious acid solution including mercury as an impurity, said method comprising the steps of adjusting the pH of the solution to approximately between .8 and 2, treating the solution with sulphur dioxide to precipitate a small amount of selenium thereby to collect the mercury in the solution, separating the selenium precipitate with the mercury collected thereby from the solution, and recovering the selenium from the solution by treating the solution with sulphur dioxide to precipitate the selenium therein.

References Cited in the file of this patent

UNITED STATES PATENTS

| 1,730,681 | Ogden et al. | Oct. 8, 1929 |
| 2,186,085 | Wein | Jan. 9, 1940 |
| 2,349,697 | Bierly | May 23, 1944 |
| 2,567,251 | Stitt | Sept. 11, 1951 |

FOREIGN PATENTS

| 515,676 | Great Britain | Mar. 4, 1938 |
| 644,743 | Great Britain | Oct. 18, 1950 |

OTHER REFERENCES

"Ion Exchangers in Analytical Chem.," by Olaf Samuelson, pages 151, 160 (John Wiley and Sons, Inc., N. Y.), 1953 ed.